United States Patent [19]
Doorakian et al.

[11] 3,956,237
[45] May 11, 1976

[54] EPOXY RESIN COMPOSITIONS COMPRISING LATENT AMINE CURING AGENTS AND NOVEL ACCELERATORS

[75] Inventors: George A. Doorakian, Waltham; Lawrence G. Duquette, Maynard, both of Mass.

[73] Assignee: The Dow Chemical Company, Midland, Mich.

[22] Filed: July 8, 1974

[21] Appl. No.: 486,721

[52] U.S. Cl............................. 260/47 EN; 260/2 N; 260/59 EP
[51] Int. Cl.².......................................... C08G 30/14
[58] Field of Search .................. 260/47 EN, 2 N, 59

[56] References Cited
UNITED STATES PATENTS

| | | | |
|---|---|---|---|
| 3,386,956 | 6/1968 | Nawakowski et al. | 260/47 |
| 3,759,914 | 9/1973 | Simms et al. | 260/47 X |

Primary Examiner—Murray Tillman
Assistant Examiner—T. Pertilla
Attorney, Agent, or Firm—L. Wayne White

[57] ABSTRACT

Novel epoxy resin compositions are disclosed which comprise (A) an epoxy resin, (B) a latent amine curing agent for said epoxy resin, and (C) a unique class of latent accelerators corresponding to formula I

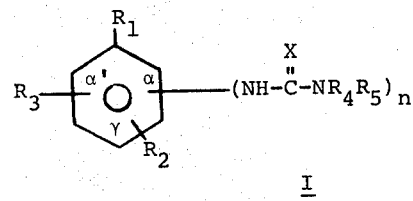

wherein:
X is an atom of oxygen or sulfur;
$n$ is 1 or 2;
$R_1$ is lower alkyl, chloro or bromo;
$R_2$ is hydrogen, lower alkyl, chloro or bromo; romo;
$R_3$ is hydrogen or an inert organic radical; or
$R_1$ and $R_2$ or $R_3$ can be joined to form a 5- or 6-membered carbocylic ring; and
—$NR_4R_5$ is the organic residue derived by the removal of the amino hydrogen atom from a secondary amine;
with the proviso that at least one of the urea or thiourea substituents is located $\alpha$ on the benzene nucleus with respect to $R_1$; and
with the proviso that when $n$ is 2, I is the position isomer having the urea or thiourea substituents located $\alpha,\alpha'$ on the benzene nucleus with respect to $R_1$, or, I is a mixture of position isomers consisting essentially of at least about 35 percent of the aforesaid $\alpha,\alpha'$ position isomer and up to about 65 percent of the $\alpha,\gamma$ isomer.

8 Claims, No Drawings

EPOXY RESIN COMPOSITIONS COMPRISING LATENT AMINE CURING AGENTS AND NOVEL ACCELERATORS

BACKGROUND OF THE INVENTION

The term "epoxy resins" defines a well known class of organic compounds, each member of which bears a plurality of 1,2-epoxy groups. Such epoxy resins are commercially available and are used as adhesives, surface coatings, potting and encapsulating compositions, components in laminates, fillers and powder coatings, and the like. In such utilities the epoxy resins are normally formulated with one or more curing agents and cure rate accelerators just prior to use, thus giving compositions which are thermally curable at satisfactory reaction rates and/or at lower reaction temperatures.

Normally the epoxy resin compositions are marketed as a two-package system wherein one package contains the epoxy resin and the second package contains the curing agent and cure rate accelerator. This marketing approach has inherent technical problems which make it highly desirable to market a one-package system in which the epoxy resin, the curing agent, accelerator and other components are blended together under controlled conditions. Such a one-package system would eliminate costly field mixing by the consumer who in many instances does not have the proper equipment to institute a thorough blend of the components and/or a proper appreciation of the need to make and apply a homogeneous mixture of the components for optimum results.

The need for a one-package epoxy resin system is therefore widely recognized by the industry and is a goal sought by many manufacturers.

Various problems have been observed in quest of this goal, however, which have been the subject of much research. For example, most epoxy curing agents react readily with epoxy resins at conventional storage temperatures and are, therefore, obviously unsatisfactory. Those few epoxy curing agents which are latent (i.e., they do not react with the epoxy resins at conventional storage temperatures) often require high temperatures and/or long reaction times to achieve a satisfactory degree of cure. This problem has been solved in part by the inclusion of various accelerators to shorten the cure time and lower the reaction temperature. Unfortunately, such accelerators often tend to deleteriously affect the shelf-life stability of the formulated compositions and/or cause large voids and an undesirable appearance in the final product by virtue of the fact that their thermal degradation products are gases.

Some of these problems were apparently solved, in part at least, by using the accelerators described by Nawakowski et al. U.S. Pat. No. 3,386,956) and Simms et al. (U.S. Pat. No. 3,759,914). The accelerators there described were aromatic ureas having an aromatic hydrocarbon nucleus bearing one or more urea substituents and, optionally, certain other substituents in addition to the urea substituent(s). The specific compounds named normally had the ring substituents located on the $\beta$ or $\gamma$ carbon atom of the aromatic nucleus, relative to the carbon atom bearing a urea substituent. The manner(s) of making and using such accelerators in combination with latent amine curing agents in convention epoxy resin compositions are likewise taught in the above patents. The disclosure of U.S. Pat. Nos. 3,386,956 and 3,759,914 are incorporated herein by reference.

SUMMARY OF THE INVENTION

We have discovered new and improved one-package epoxy compositions which are useful as adhesives and surface coatings (particularly for metallic articles) which comprise A. an epoxy resin bearing a plurality of 1,2-epoxy groups, B. a latent amine curing agent for said epoxy resins, and C. an accelerator corresponding to formula I or a mixture of such accelerators,

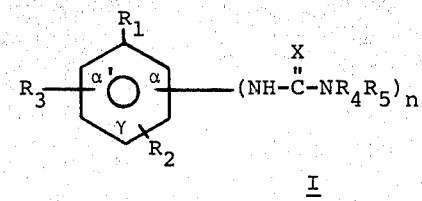

$$\underline{I}$$

wherein:
X is an atom of oxygen or sulfur;
$n$ is 1 or 2;
$R_1$ is lower alkyl, chloro or bromo;
$R_2$ is hydrogen, lower alkyl, chloro or bromo;
$R_3$ is hydrogen or an inert organic radical; or
$R_1$ and $R_2$ or $R_3$ can be joined to form a 5- or 6-numbered carbocylic ring; and
—$NR_4R_5$ is the organic residue derived by the removal of the amino hydrogen atom from a secondary amine;
with the proviso that at least one of the urea or thiourea substituents is located $\alpha$ on the benzene nucleus with respect to $R_1$; and
with the proviso that when $n$ is 2, I is the position isomer wherein the urea or thiourea substituents are located $\alpha$ $\alpha'$ on the benzene nucleus with respect to $R_1$, or, I is a mixture of position isomers consisting essentially of at least about 35 percent of the aforesaid $\alpha,\alpha$ position isomer and up to about 65 percent of the $\alpha,r$ isomer.

In the above definition of $R_1$ and $R_2$, the term "lower alkyl" means alkyl groups of from 1 to 6 carbon atoms (such as methyl, ethyl, isopropyl, hexyl, and the like).

In the above definition of $R_3$, the term "inert organic radical" means an organic radical which is inert towards isocyanate, isothiocyanate and amine groups during the preparation of I by the method described below, and which is inert to epoxy groups at conventional storage temperatures or higher. Such groups therefore include hydrocarbyl groups (such as alkyl, aryl, alkaryl, aralkyl, alkenyl, and cycloalkyl groups); hydrocarbyl groups whose chain length is interrupted by an ether, sulfide, sulfite, sulfone, amide, ester, urethane, or urea linkage(s) or other such linkage which is stable and inert as required; hydrocarbyloxy groups; hydrocarbylthio groups; and the like. The ring position and presence of an $R_3$ substituent (other than hydrogen) is optional and is not critical to the performance of the instant accelerators in the instant invention.

The accelerators here used are sterically hindered ureas which are superior to those named and used by Nawakowski et al. and/or Simms et al. They are superior in the sense that they give a faster cure rate at comparable reaction temperatures without sacrificing the latency of the total one-package system.

We have also discovered that mixtures of accelerators from I above are better than any one of the accelerators used individually. I.e., the formulated epoxy resin compositions have shorter gel times than when an equal amount of either accelerator is used individually. This synergistic effect was totally unexpected and unobvious.

DETAILED DESCRIPTION OF THE INVENTION

The Accelerators

The instant class of accelerators here used are sterically hindered ureas and thioureas which correspond to formula I above. Members of this class are conveniently prepared by reacting an α-substituted aromatic mono- or diisocyanate (or isothiocyanate) with a secondary amine under conventional reaction conditions. This reaction is represented by the following equation:

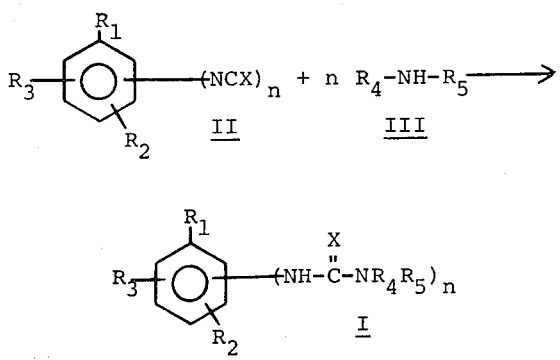

The above preparative reactions are normally conducted in an inert solvent (such as benzene, toluene, etc.) and the products (I) are thus obtained as solid precipitates which are isolated by filtration.

The aromatic mono- and diisocyanate (and isothiocyanate) reactants used in the above preparative reactions are represented by formula II above in which $R_1-R_3$, X and $n$ have the aforesaid meanings with the same provision regarding the ring position(s) of the isocyanate or isothiocyanate groups (—NCX) relative to $R_1$ in II as for the urea and thiourea substitutent in I. This is a known class of compounds having many members. The aromatic isocyanates are more readily available, comercially, than the isothiocyanates. Therefore, the ureas in I (wherein X is oxygen) are preferred over the thioureas.

Illustrative examples of suitable such reactants include: 2,6-toluene diisocyanate and mixtures thereof with 2,4-toluene diisocyanate with the former compound being present in said mixtures in amounts of at least about 35 percent and the latter compound being present in amounts of up to about 65 percent, 2-methylphenylisocyanate, 2-isopropylphenyl, 2-hexylphenylisocyanate, 2-bromophenylisocyanate, 2-methyl-4-phenoxyphenylisocyanate, 2,6-dichloro-4-octylphenylisocyanate, 2,6-diethyl-4-diphenylisocyanate, 2,3,6-trichlorophenylisocyanate, and the corresponding isothiocyanates, and the like.

The secondary amine reactants used in the above process are likewise a known class of reactants, each member of which bears a reactive secondary amino hydrogen and reacts with epoxy resins at elevated temperatures (e.g., from about 50°C to about 150°C). Such amines correspond to the general formula $R_4$—NH—$R_5$, wherein $R_4$ and $R_5$ are each independent by hydrocarbyl or inertly substituted hydrocarbyl groups. $R_4$ and $R_5$ can also be combined through the amino nitrogen atom to form a 5- or 6- membered heterocyclic ring which may optionally include one other non-adjacent hetero atom of oxygen, sulfur or nitrogen. The secondary amines used in the above process normally have a total carbon content of from 2 to about 20 carbon atoms (preferably from 2 to 12 carbon atoms). Illustrative examples of suitable amines include dialkylamines (such as dimethylamine, diethylamine, methyl octyl amine, and the like), alkyl aralkyl amines (such as benzyl methyl amine, phenethyl ethyl amine, and the like), alkyl aryl amines (such as phenyl butyl amine, naphthyl methyl amine, and the like), etc.

Formula I covers a class of compounds having many members, many of which are not listed by name herein. However, it is believed that an exhaustive listing of such accelerators is both unnecessary and impractical since those skilled in the art will know by direct comparison of the chemical structure if some particular, albeit unnamed, compound of interest is included within the scope of I. Illustrative examples of the instant accelerators include: N-(2-methylphenyl)-N',N'-diethylurea, N-(2-ethylphenyl)-N'-methyl-N'-hexylurea, N-(2-butylphenyl)-N',N'-tetramethyleneura, N-(2-hexylphenyl-N,N'-dimethylurea, N-(2-chlorophenyl)-N,N'-dibutylurea and the corresponding compounds bearing a methyl, ethyl, propyl, butyl, chloro or bromo substituent in the 6-ring position, and the corresponding compounds bearing a methyl, butyl, octyl, dodecyl, phenyl, tolyl, xylyl, phenylpropylidine, phenoxy, methoxy, ethoxyl, dodecoxy substituent in the 4-ring position, and other like compounds as will be readily apparent to those of ordinary skill in the epoxy resin art.

The preferred accelerators are those of formula I wherein: X is oxygen, $n$ is 1, $R_1$ is methyl, ethyl or chloro, $R_2$ is hydrogen or $R_1$, $R_3$ is hydrogen, lower alkyl ($C_1$ to $C_6$) or chloro, and —$NR_4R_5$ is the residue derived by removal of the amino hydrogen from a di-lower alkyl ($C_1$ to $C_6$) amine or pyrrolidine. Also preferred accelerators are those of formula I wherein: X is oxygen, $n$ is 2, $R_1$ is methyl, $R_2$ and $R_3$ are each hydrogen and —$NR_4R_5$ is the residue derived by removal of amino hydrogen from a di-lower alkyl($C_1$ to $C_6$) amine or pyrrolidine. The later compounds being formed by reacting toluene diisocyanate with a di-lower alkyl amine or pyrrolidine.

The most preferred accelerators are represented by the following formulas

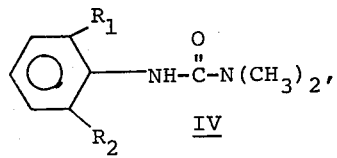

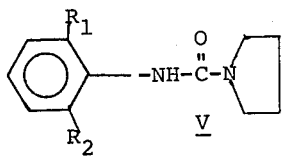

and/or

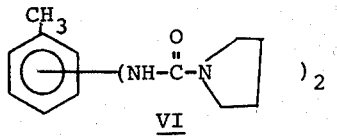

wherein $R_1$ and $R_2$ are the same and are chloro or ethyl.

Compounds of formula VI are normally obtained as isomeric mixtures containing from about 65 to about 85 weight percent of the 2,4-isomer and the preponderance of the remainder is the 2,6-isomer. Isomeric mixtures of VI or the pure compounds are suitable for use in the instant invention.

The instant accelerators are normally used in amounts of from about 0.1 to about 200 percent by weight, based on the weight of the latent amine curing agent.

The Epoxy Resin and Amine Curing Agent

The epoxy resin component as well as the latent amine curing agents and ratio of such components in one-package systems is conventional, as illustrated, for example, by the Simms et al. patent and by the following U.S. Pat. Nos.:

| | |
|---|---|
| 3,391,095 | 3,635,894 |
| 3,624,032 | 3,632,795 |
| 3,647,923 | 3,678,007 |
| 3,632,427 | 3,630,996 |

Since such components and mixtures thereof are well known and conventional, there is no need to provide long listings of illustrative examples of each class of components. Suffice it to say that any member of the known class of epoxy resins and latent amine curing agent therefor is suitable for use in the instant invention.

Preferred epoxy resins are the diglycidyl ethers of bisphenol A; the urethane-modified derivatives of the diglycidyl ethers of bisphenol A which are prepared by reacting same with an isocyanate (e.g., toluene diisocyanate); and the epoxy novolac resins obtained by reacting, preferably in the presence of a basic catalyst, epichlorohydrin with a resinous condensate of formaldehyde with a mono- or polyhydric phenol (e.g., phenol or bisphenol A).

The preferred latent amine curing agent is dicyandiamide.

The following examples will further illustrate the instant invention.

EXPERIMENTS 1–4

The accelerators noted in Table 1 were separately blended at a 4.76 weight percent level into equal aliquots of a thermally curable mixture comprising a commercially available epoxy resin (the diglycidyl ether of bisphenol A) and a conventional amount of curing agent (dicyandiamide). The shelf-life stability and gel times (at 141°C) of each resulting formulation was determined by standard techniques and the results summarized in Table 1 below.

Table 1

| Ex. | Accelerator | Shelf-Life Stability (Months) | Gel-Time (Seconds) |
|---|---|---|---|
| 1 | Cl-⌬-NH-C(O)-N(CH$_3$)$_2$ (with Cl) | 6 | 335 |
| 2 | ⌬-NH-C(O)-N(CH$_3$)$_2$ (with Cl, Cl) | 5.5 | 215 |
| 3 | Cl-⌬-NH-C(O)-N⌐ (with Cl) | 6 | 579 |
| 4 | ⌬-NH-C(O)-N⌐ (with Cl, Cl) | 6 | 331 |

The above series of experiments demonstrates the superiority of the instant accelerators (cf., experiments 2 and 4) over the sterically unhindered urea-type accelerators. The shelf-life stability of each formulation in Experiments 1–4 was excellent.

EXPERIMENTS 5–13

The following series of experiments were conducted in a manner analogous to Experiments 1–4 above except for the accelerator and/or amount of accelerator used. Experiment 13 represents a "standard" for comparison.

Table 2

| Ex. | Accelerator | Amount (Weight Percent) | Gel-Time (Seconds) |
|---|---|---|---|
| 5 | ⌬-NH-C(O)-N⌐ (with Cl, Cl) | 9.08 | 283 |
|  |  | 4.76 | 331 |

Table 2-continued

| Ex. | Accelerator | Amount (Weight Percent) | Gel-Time (Seconds) |
|---|---|---|---|
|   |   | 2.44 | 462 |
| 6 | 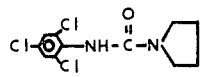 | 9.08<br>4.76 | 297<br>360 |
| 7 | 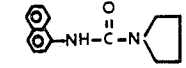 | 9.08<br>4.76 | 292<br>389 |
| 8 | 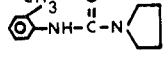 | 9.08<br>4.76 | 300<br>389 |
| 9 | 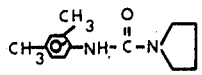 | 4.76 | 386 |
| 10 | 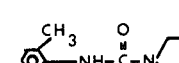 | 9.08<br>4.76 | 308<br>375 |
| 11 | 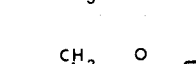 | 4.76 | 364 |
| 12 | 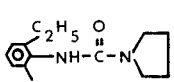 | 3.84 | 440 |
| 13 | 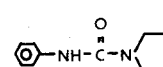 | 9.08<br>4.76 | 402<br>510 |

EXPERIMENTS 14–21

The following series of experiments were conducted in a manner analogous to Experiments 5–13 above except for the accelerator and/or amount of accelerator used. Experiments 20 and 21 represent a standard and a blank, respectively, for comparison.

Table 3

| Ex. | Accelerator | Amount (Weight Percent) | Gel-Time (Seconds) |
|---|---|---|---|
| 14 | 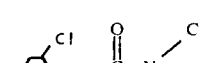 | 4.76<br>2.44 | 215<br>300 |
| 15 | 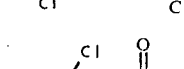 | 4.76<br>2.44 | 237<br>347 |
| 16 | 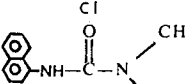 | 4.76<br>2.44 | 222<br>312 |

Table 3-continued

| Ex. | Accelerator | Amount (Weight Percent) | Gel-Time (Seconds) |
|---|---|---|---|
| 17 | 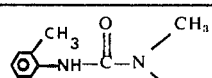 | 4.76<br>2.44 | 225<br>293 |
| 18 | 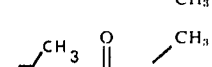 | 4.76<br>2.44 | 204<br>293 |
| 19 | 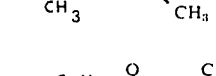 | 4.76<br>2.44<br>0.75 | 226<br>329<br>826 |
| 20 | 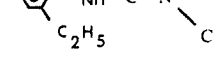 | 4.76 | 298 |
| 21 | None | 0 | >1000 |

EXPERIMENTS 22–25

The following series of experiments were conducted in a manner analogous to Experiments 14–21 above except for the accelerator and/or amount of accelerator used.

Table 4

| Ex. | Accelerator | Amount (Weight Percent) | Gel-Time (Seconds) |
|---|---|---|---|
| 22 | 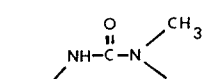 | 4.76<br>2.44 | 187<br>206 |
| 23 | 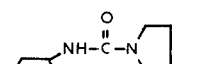 | 4.76<br>2.44 | 334<br>368 |
| 24 | 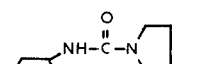 | 9.08<br>4.76<br>2.44 | 353<br>392<br>>500* |

*As used herein, the symbol ">" means greater than. In experiments bearing the notation ">", the mixtures were not cured as of the indicated time and the experiment was stopped.

EXPERIMENTS 25–29

Another series of experiments was conducted using accelerators corresponding to formulas i and ii.

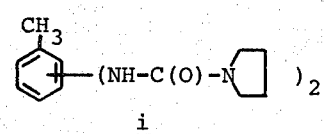

i

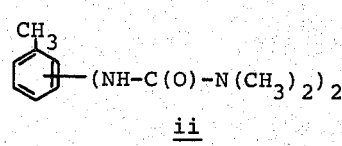

ii

In both i and ii, the isomer distribution was about 65 percent of the 2,4-isomer and about 35 percent of the 2,6-isomer.

Accelerators i and/or ii were mixed at various loading levels into equal aliquots of a conventional mixture of an epoxy resin and dicyandiamide. The gel times (at 141°C) of each resulting formulation was determined and the results summarized in Table 5 below.

Table 5

| Ex. | Accelerator | Loading Level (Wt. %) | Gel-Time (Seconds) |
|---|---|---|---|
| 25 | i | 3.48 | 378 |
| 26 | ii | 0.75 | >380 |
| 27 | i (3.48 wt. %) + ii (0.75 wt. %) | | 204 |
| 28 | i | 4.23 | 345 |
| 29 | ii | 4.23 | 200 |

In Experiment 29, some gassing occurred during the cure cycle which created undesirable voids in the cured product.

The above series of experiments demonstrates the synergistic effect observed when mixtures of the instant accelerators are used.

EXPERIMENTS 30–32

This series of experiments was conducted in a manner analogous to Experiments 25–29 except for the accelerators and/or the amount of accelerator used.

Table 6

| Ex. | Accelerator(s) | Amount (Weight Percent) | Gel-Time (Seconds) |
|---|---|---|---|
| 30 | iii (structure with C₂H₅ groups, NH-C(O)-N pyrrolidine) | 3.84 | 440 |
| 31 | iv (structure with C₂H₅ groups, NH-C(O)-N(CH₃)₂) | 0.99 | 600 |

Table 6-continued

| Ex. | Accelerator(s) | Amount (Weight Percent) | Gel-Time (Seconds) |
|---|---|---|---|
| 32 | iii (3.84 wt. %) + iv (0.99 wt. %) | | 355 |

This series of experiments likewise demonstrates the synergistic effect of mixtures of the instant accelerators on the cure rate.

EXPERIMENTS 33–38

The experiments summarized in Table 7 were conducted in a manner analogous to Experiments 25–29 except for the accelerators and/or the amount of accelerator used.

Table 7

| Ex. | Accelerator | Amount (Weight Percent) | Gel-Time (Seconds) |
|---|---|---|---|
| 33 | v (phenyl-NH-C(O)-N pyrrolidine) | 3.84 | 530 |
| 34 | vi (tolyl with two NH-C(O)-N(CH₃)₂ groups) | 0.99 | >367 |
| 35 | vii (naphthyl-NH-C(O)-N(CH₃)₂) | 0.99 | 668 |
| 36 | v (3.84 wt. %) + vi (0.99 wt. %) | | 354 |
| 37 | v (3.84 wt. %) + vii (0.99 wt. %) | | 393 |

This series of experiments demonstrates two things: First, that the instant accelerators can be used in combination with other accelerators, and secondly, that the instant accelerators even enhance the reactivity of sterically unhindered urea-type accelerators.

EXPERIMENTS 38–49

In this series of experiments the instant accelerators were evaluated in the curable epoxy formulations described by Symms et al. U.S. Pat. No. 3,759,914). Formulation:

```
10.0 g.   of XD-3599
 0.8 g.   of Dicyandiamide
 0.5 g.   of Accelerator (4.42 weight percent)
11.3 g.
```

XD-3599 is a urethane-modified diepoxide of bisphenol A having an epoxy equivalent weight of from about 225–250, a product of The Dow Chemical Company. The results of the experiments are summarized in Table 8.

Table 8

| Ex. | Accelerator | Gel-Time (Seconds) |
|---|---|---|
| 38 | Cl-(C6H3Cl)-NH-C(O)-N(CH3)2 | 335 |
| 39 | (2,6-Cl2-C6H3)-NH-C(O)-N(CH3)2 | 215 |
| 40 | Cl-(C6H3Cl)-NH-C(O)-N(pyrrolidinyl) | 579 |
| 41 | (2,6-Cl2-C6H3)-NH-C(O)-N(pyrrolidinyl) | 331 |
| 42 | Cl-(C6H3Cl)-NH-C(O)-N(CH3)(CH2)3CH3 | 600 |
| 43 | (2,6-Cl2-C6H3)-NH-C(O)-N(CH3)(CH2)3CH3 | 422 |
| 44 | Cl-(C6H3Cl)-NH-C(O)-N(CH3)-CH2-CH2-OH | 650 |
| 45 | (2,6-Cl2-C6H3)-NH-C(O)-N(CH3)-CH2CH2OH | 441 |
| 46 | Cl-(C6H3Cl)-NH-C(O)-N(piperidinyl) | >800 |
| 47 | (2,6-Cl2-C6H3)-NH-C(O)-N(piperidinyl) | 513 |
| 48 | Cl-(C6H3Cl)-NH-C(O)-N(morpholinyl) | >2500 |
| 49 | (2,6-Cl2-C6H3)-NH-C(O)-N(morpholinyl) | 1808 |

Gel Times were obtained at 141°C.

This series of experiments likewise shows the superiority of the instant accelerators over the sterically unhindered urea-type accelerators. The above formulations have shelf-life stabilities of from 2 to 6 months or more at conventional storage temperatures.

The above experiments are merely representative and are not all inclusive. Other accelerators within formula I can be similarly used with good results.

We claim:

1. A thermally curable epoxy composition comprising
   A. an epoxy resin bearing a plurality of 1,2-epoxy groups;
   B. a latent amine curing agent for said epoxy resin; and
   C. a small but sufficient amount of at least one sterically hindered urea or thiourea accelerator to increase the rate of reaction between (A) and (B) at elevated temperatures; said accelerator corresponding to the formula

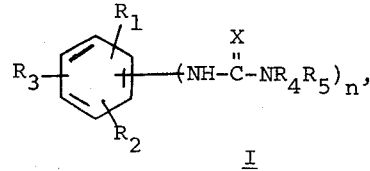

$$\underline{I}$$

wherein:
X is an atom of oxygen or sulfur;
$n$ is 1 or 2;
$R_1$ is lower alkyl, chloro or bromo;
$R_2$ is hydrogen, lower alkyl, chloro or bromo;
$R_3$ is hydrogen or an inert organic radical, or
$R_1$ and $R_2$ or $R_1$ and $R_3$ can be joined to form a 5- or 6-membered carbocyclic ring;
—$NR_4R_5$ is the organic residue derived by the removal of the amino hydrogen atom from a secondary amine;
with the proviso that $R_1$ is located $\alpha$ on the benzene nucleus to at least one of the urea of thiourea substituents; and
with the proviso that when $n$ is 2, I is the position isomer having the urea or thiourea substituents located $\alpha,\alpha'$ on the benzene nucleus with respect to $R_1$, or, I is a mixture of position isomers consisting essentially of at least about 35 percent of the aforesaid $\alpha,\alpha'$ position isomer and up to about 65 percent of the $\alpha,\gamma$ isomer.

2. The composition defined by claim 1 wherein X is oxygen; $n$ is 1; $R_1$ is methyl, ethyl or chloro; $R_2$ is hydrogen or the same as $R_1$; $R_3$ is hydrogen, lower alkyl or chloro; and —$NR_4R_5$ is the residue derived by removal of the amino hydrogen from a di-lower alkyl amine or pyrrolidine.

3. The composition defined by claim 1 wherein X is oxygen; $n$ is 2; $R_1$ is methyl; $R_2$ and $R_3$ are each hydrogen; and —$NR_4R_5$ is the residue derived by the removal of the amino hydrogen atom from a di-lower alkyl amine or pyrrolidine.

4. The composition defined by claim 1 wherein (C) is at least one of the hindered ureas corresponding to the formulas

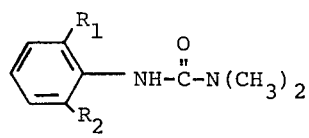

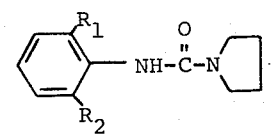

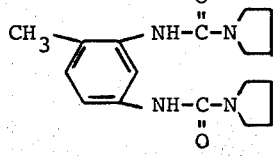

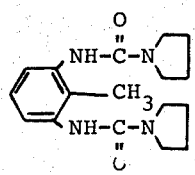

wherein $R_1$ and $R_2$ are the same and are each chloro or ethyl.

5. The composition defined by claim 4 wherein (C) is a mixture of

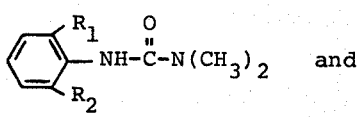  and

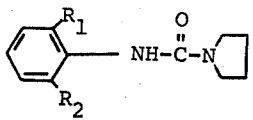

wherein $R_1$ and $R_2$ are the same and are each chloro or ethyl.

6. The composition defined by claim 1 wherein (A) is the diglycidyl ether of 4,4′-isopropylidenediphenol or a urethane-modified epoxy resin or an epoxy novolac resin.

7. The composition defined by claim 1 wherein (B) is dicyandiamide.

8. The composition defined by claim 1 wherein
A. is the diglycidyl ether of bisphenol A,
B. is dicyandiamide,
C. is at least one of the hindered ureas corresponding to the formulas

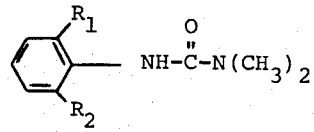

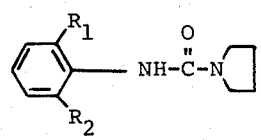

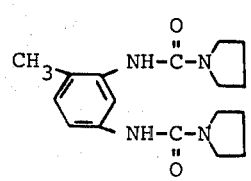

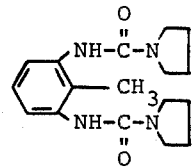

* * * * *